United States Patent
Bono et al.

(10) Patent No.: US 9,558,068 B1
(45) Date of Patent: Jan. 31, 2017

(54) RECOVERING FROM METADATA INCONSISTENCIES IN STORAGE SYSTEMS

(71) Applicant: EMC Corporation, Hopkinton, MA (US)

(72) Inventors: Jean-Pierre Bono, Westborough, MA (US); Philippe Armangau, Acton, MA (US); Daniel E. Cummins, Hudson, NH (US); David W. Harvey, Newton Center, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 168 days.

(21) Appl. No.: 14/231,075

(22) Filed: Mar. 31, 2014

(51) Int. Cl.
*G06F 11/00* (2006.01)
*G06F 11/14* (2006.01)
*G06F 3/06* (2006.01)
*G06F 17/30* (2006.01)

(52) U.S. Cl.
CPC ......... *G06F 11/1412* (2013.01); *G06F 3/0619* (2013.01); *G06F 3/0653* (2013.01); *G06F 3/0689* (2013.01); *G06F 17/30129* (2013.01)

(58) Field of Classification Search
CPC .. G06F 11/1412; G06F 3/0689; G06F 3/0619; G06F 3/0653; G06F 17/30129
USPC .......................................................... 714/15
See application file for complete search history.

(56) References Cited

U.S. PATENT DOCUMENTS

| 8,285,758 | B1 * | 10/2012 | Bono | G06F 17/30079 707/822 |
| 9,152,353 | B1 * | 10/2015 | Wang | G06F 3/0689 |
| 2005/0165862 | A1 * | 7/2005 | Loafman | G06F 11/1435 |
| 2010/0115009 | A1 * | 5/2010 | Callahan | G06F 17/30067 707/825 |

* cited by examiner

*Primary Examiner* — Yair Leibovich
(74) *Attorney, Agent, or Firm* — Krishnendu Gupta; Jason A. Reyes; Deepika Bhayana

(57) ABSTRACT

A method is used in recovering from metadata inconsistencies in storage systems. A metadata inconsistency is detected in a portion of a file system. The file system is managed by upper-layer component. The portion of the file system is recovered. Lower-layer component recovers the portion of the file system. The portion of the file system is validated. The upper-layer component validates the portion of the file system.

20 Claims, 7 Drawing Sheets

RECOVERING FROM METADATA INCONSISTENCIES IN STORAGE SYSTEMS

BACKGROUND

Technical Field

This application relates to recovering from metadata inconsistencies in storage systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Such a data storage system typically includes processing circuitry and a set of disk drives (disk drives are also referred to herein as simply "disks" or "drives"). In general, the processing circuitry performs load and store operations on the set of disk drives on behalf of the host devices. In certain data storage systems, the disk drives of the data storage system are distributed among one or more separate disk drive enclosures (disk drive enclosures are also referred to herein as "disk arrays" or "storage arrays") and processing circuitry serves as a front-end to the disk drive enclosures. The processing circuitry presents the disk drive enclosures to the host device as a single, logical storage location and allows the host device to access the disk drives such that the individual disk drives and disk drive enclosures are transparent to the host device.

Disk arrays are typically used to provide storage space for one or more computer file systems, databases, applications, and the like. For this and other reasons, it is common for disk arrays to be structured into logical partitions of storage space, called logical units (also referred to herein as LUs or LUNs). For example, at LUN creation time, storage system may allocate storage space of various storage devices in a disk array to be presented as a logical volume for use by an external host device. This allows a disk array to appear as a collection of separate file systems, network drives, and/or volumes.

Disk arrays may also include groups of physical disks that are logically bound together to represent contiguous data storage space for applications. For example, disk arrays may be divided into redundant array of inexpensive disks (RAID) groups, which are disk arrays created by logically binding individual physical disks together to form the RAID groups. RAID groups represent a logically contiguous address space distributed across a set of physical disks. Each physical disk is subdivided into pieces used to spread the address space of the RAID group across the group (along with parity information if applicable to the RAID level). The physically contiguous pieces of the physical disks that are joined together to create the logically contiguous address space of the RAID group are called stripes. Stripes may form blocks and blocks may be allocated to create logical representations of storage space for use by applications within a data storage system.

As described above, applications access and store data incrementally by use of logical storage array partitions, known as logical units (LUNs). LUNs are made up of collections of storage blocks of a RAID array and are exported from the RAID array for use at the application level.

Existing data storage systems may utilize different techniques in connection with managing data availability in data storage systems, for example, in the event of a data storage device failure. There are a number of different RAID (Redundant Array of Independent or Inexpensive Disks) levels and techniques that may be used in connection with providing a combination of fault tolerance and/or improved performance for data storage devices. Different RAID levels (e.g., RAID-1, RAID-5, RAID-6, and the like) may provide varying degrees of fault tolerance. Further, RAID parity schemes may be utilized to provide error detection during the transfer and retrieval of data across a storage system.

Large storage arrays today manage many disks that are not identical. Storage arrays use different types of disks, i.e., disks with different RAID (Redundant Array of Independent or Inexpensive Disks) levels, performance and cost characteristics.

Generally, a RAID system is an array of multiple disk drives which appears as a single drive to a data storage system. A goal of a RAID system is to spread, or stripe, a piece of data uniformly across disks (typically in units called chunks), so that a large request can be served by multiple disks in parallel. For example, RAID-5 techniques can be used in connection with a data storage system to protect from a single device failure.

In a particular RAID-5 context, for example, which comprises a storage array of five disk modules, each disk has a plurality of "N" data storage sectors, corresponding sectors in each of the five disks being usually referred to as a "stripe" of sectors. With respect to any stripe, 80% of the sector regions in the stripe (i.e., in a 5 disk array effectively 4 out of 5 sectors) is used for user data and 20% thereof (i.e., effectively 1 out of 5 sectors) is used for redundant, or parity, data. The use of such redundancy allows for the reconstruction of user data in the event of a failure of a user data sector in the stripe.

When a user data disk module fails, the redundant or parity entry that is available in the parity sector of a stripe and the data in the non-failed user data sectors of the stripe can be used to permit the user data that was in the sector of the failed disk to be effectively reconstructed so that the system can remain operative using such reconstructed data even when the user data of that sector of the failed disk cannot be accessed. The system is then said to be operating in a "degraded" mode since extra processing operations and, accordingly, extra time is required to reconstruct the data in the failed disk sector when access thereto is required.

Certain kinds of failures, however, can occur in which the storage array is left in an incoherent or effectively unusable state, e.g., a situation can occur in which there is power failure, i.e., power to a storage processor fails or the storage processor itself fails due to a hardware or software defect, or power to the disk drives themselves fails.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

The accuracy and consistency of a file system is necessary to relate applications and data used by those applications. However, there may exist the potential for data corruption in any computer system and therefore measures are taken to periodically ensure that the file system is consistent and accurate. In a data storage system, hundreds of files may be created, modified, and deleted on a regular basis. Each time a file is modified, the data storage system performs a series of file system updates. These updates, when written to disk storage reliably, yield a consistent file system. However, a file system can develop inconsistencies in several ways. Problems may result from an unclean shutdown, if a system is shut down improperly, or when a mounted file system is taken offline improperly. Inconsistencies can also result from defective hardware or hardware failures. Additionally, inconsistencies can also result from software errors or user errors.

Additionally, the need for high performance, high capacity information technology systems are driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable and highly efficient so that critical data is not lost or unavailable.

SUMMARY OF THE INVENTION

A method is used in recovering from metadata inconsistencies in storage systems. A metadata inconsistency is detected in a portion of a file system. The file system is managed by upper-layer component. The portion of the file system is recovered. Lower-layer component recovers the portion of the file system. The portion of the file system is validated. The upper-layer component validates the portion of the file system.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
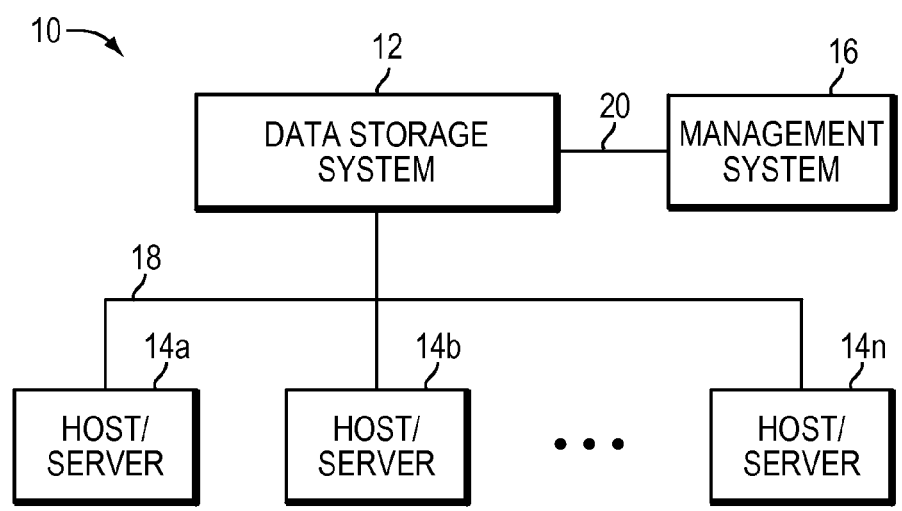
FIGS. 1-2 are examples of an embodiment of a computer system that may utilize the techniques described herein.

Described below is a technique for use in recovering from metadata inconsistencies in storage systems, which technique may be used to provide, among other things, detecting a metadata inconsistency in a portion of a file system, where the file system is managed by upper-layer component, recovering the portion of the file system, wherein lower-layer component recovers the portion of the file system, and validating the portion of the file system, wherein the upper-layer component validates the portion of the file system.

File systems typically include metadata describing attributes of a file system and data from a user of the file system. A file system contains a range of file system blocks that store metadata and data. A user of a file system access the file system using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, timestamps) about that file. The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). There may be many levels of indirect blocks arranged in a hierarchy depending upon the size of a file where each level of indirect blocks includes pointers to indirect blocks at the next lower level.

A file is uniquely identified by a file system identification number. Each data block of a file is referenced by a logical block number and/or file system block number. A logical block number of a file refers to a data block by relative position of the data block inside the file. A file system block number of a file refers to a data block by relative position of the data block on a physical disk device on which the file is stored. A file system block number for a data block is computed based on a file offset and the size of the data block. Further, as described above herein, an inode of a file includes metadata that provides a mapping to convert a file system block number of a data block to its corresponding logical block number. For example, in case of a data block size of 4 kilobytes (KB), if a file offset value is smaller than 4096 bytes, the file offset corresponds to the first data block of the file, which has file block number 0. Further, for example, if a file offset value is equal to or greater than 4096 bytes and less than 8192 bytes, the file offset corresponds to the second data block of the file, which has file block number 1.

Generally, each file system data block of a file is associated with a respective mapping pointer. A mapping pointer of a file system block points to the file system block and includes metadata information for the file system block. A file system block associated with a mapping pointer may be a data block or an indirect data block which in turn points to other data blocks or indirect blocks. A mapping pointer includes information that help map a logical offset of a file system block to a corresponding physical block address of the file system block.

Generally, in typical file systems, inodes, which include the metadata for a file, are stored alongside the data that comprises the content of the file in a physical storage media (e.g. disks) in a data storage system. As such, physical storage devices store both the data itself and the file system metadata that is related to it. Further, each file system block of a file of a file system is associated with a per block metadata (also referred to herein as "BMD") that stores metadata for the file system block and maintains information regarding the file system block such as the logical offset at which the file system block has been allocated, an internal checksum for protecting the integrity of the information stored in the per-block metadata and so on. Further, metadata of a file system may include inodes and indirect blocks.

The loss or corruption of any of numerous types of metadata in a system such as that described above can result in inconsistencies or corruption of a file system. For example, assume that metadata within one or more cylinders that keeps track of which blocks of storage or inodes are free and which are allocated is corrupted or lost. Without such metadata, the file system is unable to write additional files, as a determination needs to be made to identify a free inode structure and a sufficient number of free data blocks. As another example, if the metadata for a particular inode is lost or corrupted, it may not be possible to access the corresponding file. As yet a further example, metadata in the file system may be corrupted so that two or more inodes both indicate that they own the same data block, resulting in inconsistencies regarding which inode actually does own the data block and has the ability to control and overwrite it. It should be appreciated that such corruptions or inconsistencies may develop in any one of numerous ways, including hardware failures, software bugs, and so on. In addition, it should be appreciated that the types of inconsistencies and problems with the file systems mentioned above are described merely for illustrative purposes, and that numerous other types of inconsistencies or problems are possible.

Generally, one mechanism for recovering from corruption or inconsistencies in a storage system is to create one or more copies of metadata of the file system such that if the file system is unable to access a primary copy of the metadata, a duplicate copy of the metadata is used by the file system. Thus, a data storage system may store a duplicate copy of the inode of a file of a file system such that if the file system is unable to access a primary copy of the inode, a duplicate copy of the inode is used by the file system.

Generally, when a file system becomes corrupted, the file system is recovered before the file system is subsequently accessed. In such a case, file system recovery logic evaluates metadata of the file system and determines inconsistencies and/or errors that may have caused the corruption of the file system. Upon detecting the inconsistencies and/or errors in such a case, the file system recovery logic attempts to recover the file system by fixing the inconsistencies and/or errors. Conventionally, in order to recover a file system, a duplicate copy of inconsistent metadata may be used. However, in such a conventional system, maintaining and using a duplicate copy of metadata consumes a large amount of system resources thereby impacting performance of a storage system.

Further, in such a conventional system, if a storage system does not maintain a duplicate copy of file system metadata by turning off a feature of metadata duplication, a checksum value of metadata may be evaluated to determine whether file system metadata is valid. Thus, in such a conventional system, when file system metadata is read, a new checksum is computed based on the file system metadata read and is compared with a checksum value associated with the file system metadata. In such a conventional system, if the newly computed checksum does not match with the checksum value stored for the file system metadata, the file system becomes offline and inaccessible to user. Further, in such a conventional system, a file system check utility (FSCK) attempts to recover the file system. Consequently, in such a conventional system, if a FSCK utility is unable to recover a file, a user may lose a large portion of enterprise data thereby causing a data loss or unavailability of the enterprise data.

Further, in such a conventional system, metadata is read from a single drive of a RAID group. Further, in such a conventional system, metadata organized on a drive includes a consistency check for determining integrity of the data. In such a conventional system, when metadata is found to be inconsistent, the metadata is rebuilt from other drives of the RAID group. In such a conventional system, when a write to a drive is lost and metadata residing on the drive is not consistent with the metadata stored in an upper layer (e.g., file system mapping layer), the consistency check for a RAID group does not detect the inconsistency between the upper and lower layer components because the metadata in itself is consistent even though not up-to-date between the two components.

By contrast, in at least some implementations in accordance with the technique as described herein, if file system metadata appears to be consistent at a RAID level when the metadata is read from a single drive but an upper layer determines that the file system metadata is inconsistent, the upper layer sends a request to the RAID level to rebuild the file system metadata. Thus, in at least one embodiment of the current technique, metadata may be read from a single drive and is only rebuild upon detecting inconsistency by an upper layer.

Further, in at least some implementations in accordance with the technique as described herein, when a file system management layer detects that a file system block including metadata of a file system is inconsistent, the file system management layer sends a request to a RAID management layer to rebuild the file system block based on metadata information such as LUN identification number, offset, and length provided by file system management layer to the RAID management layer. In such a case, if the multi-core RAID management layer successfully rebuilds the file system block, the file system management layer compares the contents of the newly rebuild file system by the RAID management layer with the checksum associated with the file system block. Based upon the comparison, the file system management layer validates that the file system block has been recovered successfully by the RAID management layer. If the file system block is successfully validated, the newly rebuild metadata is used by the file system. However, if either the RAID management layer fails to rebuild the file system block or validation of the file system block by the file system management layer fails, the file system becomes offline. Thus, in at least one embodiment of the current technique, inconsistent metadata is recovered by a lower layer component (e.g., RAID management layer) and validated by an upper layer component (e.g., file system management layer). Thus, in at least one embodiment of the current technique, even though the file system block checksum is maintained by the file system management layer, resiliency is provided by the RAID management layer instead of being maintained by the file system management layer thereby improving performance of a storage system.

In at least some implementations in accordance with the current technique as described herein, the use of the recovering from metadata inconsistencies in storage systems technique can provide one or more of the following advantages: improving efficiency of a data storage system by efficiently recovering from metadata inconsistencies in file systems, improving performance of a recovery process by using resiliency provided by RAID group management logic, and reducing unavailability of a file system by efficiently recovering metadata of the file system.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like.

In certain cases, an enterprise can utilize different types of storage systems to form a complete data storage environment. In one arrangement, the enterprise can utilize both a block based storage system and a file based storage hardware, such as a VNX™ or VNXe™ system (produced by EMC Corporation, Hopkinton, Mass.). In such an arrangement, typically the file based storage hardware operates as a front-end to the block based storage system such that the file based storage hardware and the block based storage system form a unified storage system.

Figure 2:
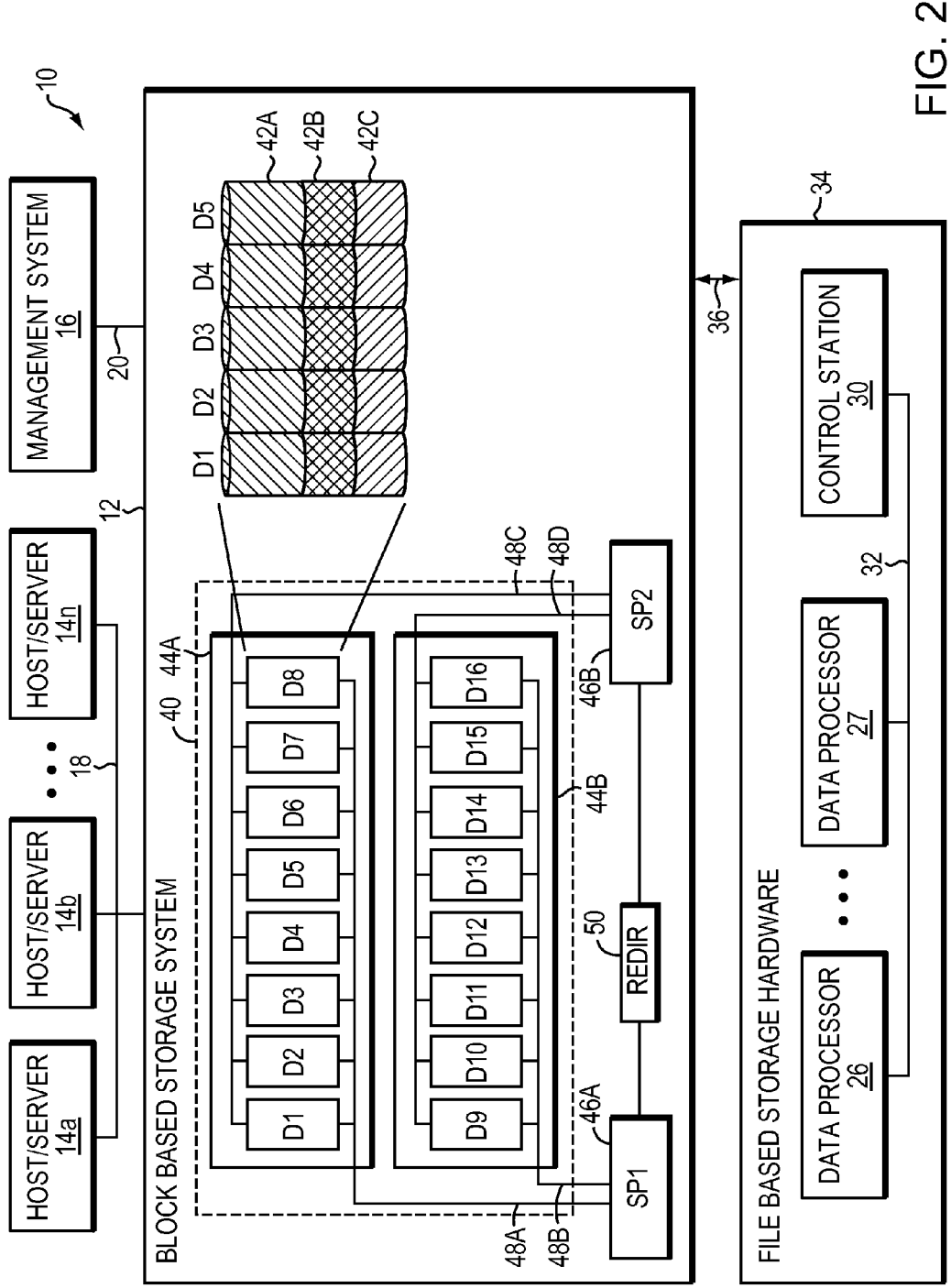

Referring now to FIG. 2, shown is an example of an embodiment of a computer system such as a unified data storage system that may be used in connection with performing the technique or techniques described herein. As shown, the unified data storage system 10 includes a block based storage system 12 and file based storage hardware 34. While the block based storage system 12 may be configured in a variety of ways, in at least one embodiment, the block based storage system 12 is configured as a storage area network (SAN), such as a VNX™ or VNXe™ system, as produced by EMC Corporation of Hopkinton, Mass. While the file based storage hardware 34 may be configured in a variety of ways, in at least one embodiment, the file based storage hardware 34 is configured as a network attached storage (NAS) system, such as a file server system produced by EMC Corporation of Hopkinton, Mass., configured as a header to the block based storage system 12.

The computer system 10 includes one or more block based data storage systems 12 connected to host systems 14a-14n through communication medium 18. The system 10 also includes a management system 16 connected to one or more block based data storage systems 12 through communication medium 20. In this embodiment of the computer system 10, the management system 16, and the N servers or hosts 14a-14n may access the block based data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

In at least one embodiment of the current technique, block based data storage system 12 includes multiple storage devices 40, which are typically hard disk drives, but which may be tape drives, flash memory, flash drives, other solid state drives, or some combination of the above. In at least one embodiment, the storage devices may be organized into multiple shelves 44, each shelf containing multiple devices. In the embodiment illustrated in FIG. 1, block based data storage system 12 includes two shelves, Shelf1 44A and Shelf2 44B; Shelf1 44A contains eight storage devices, D1-D8, and Shelf2 also contains eight storage devices, D9-D16.

Block based data storage system 12 may include one or more storage processors 46, for handling input/output (I/O) requests and allocations. Each storage processor 46 may communicate with storage devices 40 through one or more data buses 48. In at least one embodiment, block based data storage system 12 contains two storage processors, SP1 46A, and SP2 46B, and each storage processor 46 has a dedicated data bus 48 for each shelf 44. For example, SP1 46A is connected to each storage device 40 on Shelf1 44A via a first data bus 48A and to each storage device 40 on Shelf2 44B via a second data bus 48B. SP2 46B is connected to each storage device 40 on Shelf1 44A via a third data bus 48C and to each storage device 40 on Shelf2 44B via a fourth data bus 48D. In this manner, each device 40 is configured to be connected to two separate data buses 48, one to each storage processor 46. For example, storage devices D1-D8 may be connected to data buses 48A and 48C, while storage devices D9-D16 may be connected to data buses 48B and 48D. Thus, each device 40 is connected via some data bus to both SP1 46A and SP2 46B. The configuration of block based data storage system 12, as illustrated in FIG. 2, is for illustrative purposes only, and is not considered a limitation of the current technique described herein.

In addition to the physical configuration, storage devices 40 may also be logically configured. For example, multiple storage devices 40 may be organized into redundant array of inexpensive disks (RAID) groups. Although RAID groups are composed of multiple storage devices, a RAID group may be conceptually treated as if it were a single storage device. As used herein, the term "storage entity" may refer to either a single storage device or a RAID group operating as a single storage device.

Storage entities may be further sub-divided into logical units. A single RAID group or individual storage device may contain one or more logical units. Each logical unit may be further subdivided into portions of a logical unit, referred to as "slices". In the embodiment illustrated in FIG. 1, storage devices D1-D5, is sub-divided into 3 logical units, LU1 42A, LU2 42B, and LU3 42C. The LUs 42 may be configured to store a data file as a set of blocks striped across the LUs 42.

The unified data storage system 10 includes a file based storage hardware 34 that includes at least one data processor 26. The data processor 26, for example, may be a commodity computer. The data processor 26 sends storage access requests through physical data link 36 between the data processor 26 and the block based storage system 12. The data link 36 may be any one or more of a variety of networks or other type of communication connections as known to those skilled in the art. The processor included in the data processor 26 may be any one of a variety of proprietary or commercially available single or multiprocessor system, such as an Intel-based processor, or other type of commercially available processor able to support traffic in accordance with each particular embodiment and application. Further, file based storage hardware 34 may further include control station 30 and additional data processors (such as data processor 27) sharing storage device 40. A dual-redundant data link 32 interconnects the data processors 26, 27 to the control station 30. The control station 30 monitors a heartbeat signal from each of the data processors 26, 27 in order to detect a data processor failure. If a failed data processor cannot be successfully re-booted, the control station 30 will "fence off" the failed data processor and re-assign or fail-over the data processing responsibilities of the failed data processor to another data processor of the file based storage hardware 34. The control station 30 also provides certain server configuration information to the data processors 26, 27. For example, the control station maintains a boot configuration file accessed by each data processor 26, 27 when the data processor is reset.

The data processor 26 is configured as one or more computerized devices, such as file servers, that provide end user devices (not shown) with networked access (e.g., NFS and CIFS facilities) to storage of the block based storage system 12. In at least one embodiment, the control station 30 is a computerized device having a controller, such as a memory and one or more processors. The control station 30 is configured to provide hardware and file system management, configuration, and maintenance capabilities to the data storage system 10. The control station 30 includes boot strap operating instructions, either as stored on a local storage device or as part of the controller that, when executed by the controller following connection of the data processor 26 to the block based storage system 12, causes the control station 30 to detect the automated nature of a file based storage hardware installation process and access the data processor 26 over a private internal management network and execute the file based hardware installation process.

Generally, designs of block-based and file-based data storage systems often follow parallel paths. Further, many of the features provided by block-based storage, such as replication, snaps, de-duplication, migration, failover, and non-disruptive upgrade, are similar to features provided for file-based data storage systems. For user convenience, block-based and file-based storage systems are sometimes co-located, essentially side-by-side, to allow processing of both block-based and file-based host IOs in a single combined system as illustrated in FIG. 2. Alternatively, both block-based and file-based functionality may be combined in an unified data path architecture. The unified data path architecture brings together IO processing of block-based storage systems and file-based storage systems by expressing both block-based objects and file-based objects in the form of files. These files are parts of an underlying, internal set of file systems, which is stored on a set of storage units served by a storage pool. Because both block-based objects and file-based objects are expressed as files, a common set of services can be applied across block-based and file-based objects for numerous operations, such as replication, snaps, de-duplication, migration, failover, non-disruptive upgrade, and/or many other services, as these services are performed similarly for both block and file objects on the same underlying type of object—a file. Further, the unified data path architecture increases storage utilization by reallocating storage resources once allocated to block-based storage to file-based storage, and vice-versa. As block-based objects (e.g., LUNs, block-based vVols, and so forth) and file-based objects (e.g., file systems, file-based vVols, VMDKs, VHDs, and so forth) are expressed as underlying files, storage units released by any underlying file or files can be reused by any other underlying file or files, regardless of whether the files represent block-based objects or file-based objects. Additional details regarding the unified data path architecture is described in U.S. patent application Ser. No. 13/828,322 for "Unified DataPath Architecture", filed Mar. 14, 2013, the contents and teachings of which are hereby incorporated by reference in their entirety.

In at least one embodiment of the current technique, the unified data path architecture requires a file system to be hosted on a mapped LUN as a file system on a file.

Figure 3:
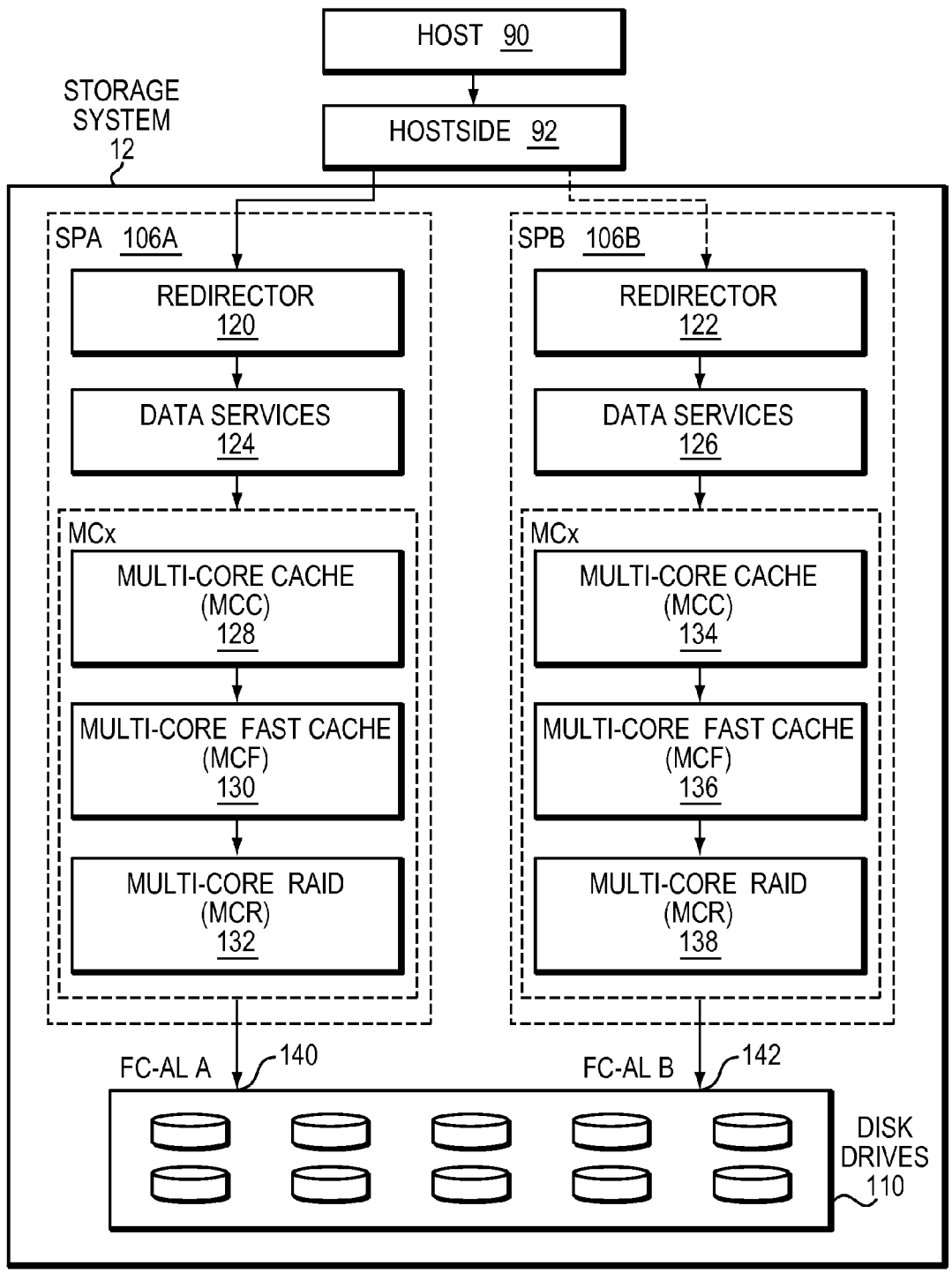
FIG. 3 is a block diagram illustrating in more detail components that may be used in connection with techniques herein.

Referring to FIG. 3, shown is more detailed representation of components that may be included in an embodiment using the techniques herein. With reference also to FIGS. 1-2, in a data storage system such as data storage system 12, a storage processor provides communications between host system 90 and disk drives 110. Data storage system 100 includes at least two storage processors 106A, 106B. Storage Processor (SPA) 106A accesses the disk drives 110 using communication loop (e.g., SAS) FC-AL 140 and storage processor (SPB) 106B accesses the disk drives 110 using communication loop FC-AL 142 (e.g. SAS).

Host system 90 may not address the disk drives of the storage systems directly, but rather access to data may be provided to one or more host systems from what the host systems view as a plurality of logical devices or logical volumes ("LVs" or "LUNs"). Host system 90 sends a request to hostside logic ("hostside") (e.g., hostside 92) to access data stored on logical devices. The hostside 92 sends appropriate status back to the host system 90 in case access to data fails. The LVs may or may not correspond to the physical disk drives. For example, one or more LVs may reside on a single physical disk drive. Data in a single data storage system may be accessed by multiple hosts allowing the hosts to share the data residing therein. Regarding terminology related to a storage system, the host or host network is sometimes referred to as the front end and from disk adapters toward the disks is sometimes referred to as the back end. A disk adapter is a component that allows disk drives to communicate with a storage processor.

In at least some systems, for example, host 90 sends an I/O request through hostside 92 to storage processor SPA 106A. Based on the I/O request, SPA 106A sends corresponding data requests to disk drives 110 through redirector 120, data services 124, and multi core RAID component. Redirector 120 enables the data storage system to provide an alternate path to a set of disk drives by redirecting I/Os from one SP to another SP. Multi core RAID component includes multi-core cache (MCC) 128, multi-core fully automated storage tiering cache (MCF) 130, and multi-core RAID (MCR) component 132 that enable the data storage system to interact with disk drives 110. If SPA 106A fails due to an error, responsibility of communication with a set of disk drive in a RAID group changes from SPA 106A to SPB 106B. In such a case, I/Os from host 90 are redirected to SPB 106B. Storage Processor SPB 106B then services those I/Os by sending the I/O requests to disk drives 110 through redirector 122, data services 124, and multi core RAID component which includes MCC 134, MCF 136 and MCR 138. In at least one embodiment of the current technique, MCC 128, 134 provides a persistent cache for mirroring write data. MCF 130, 136 reorders the I/O flow to improve system I/O performance and response time. MCR 132, 136 leverages RAID group logic to provide management and access to disk drives 110.

Figure 4:
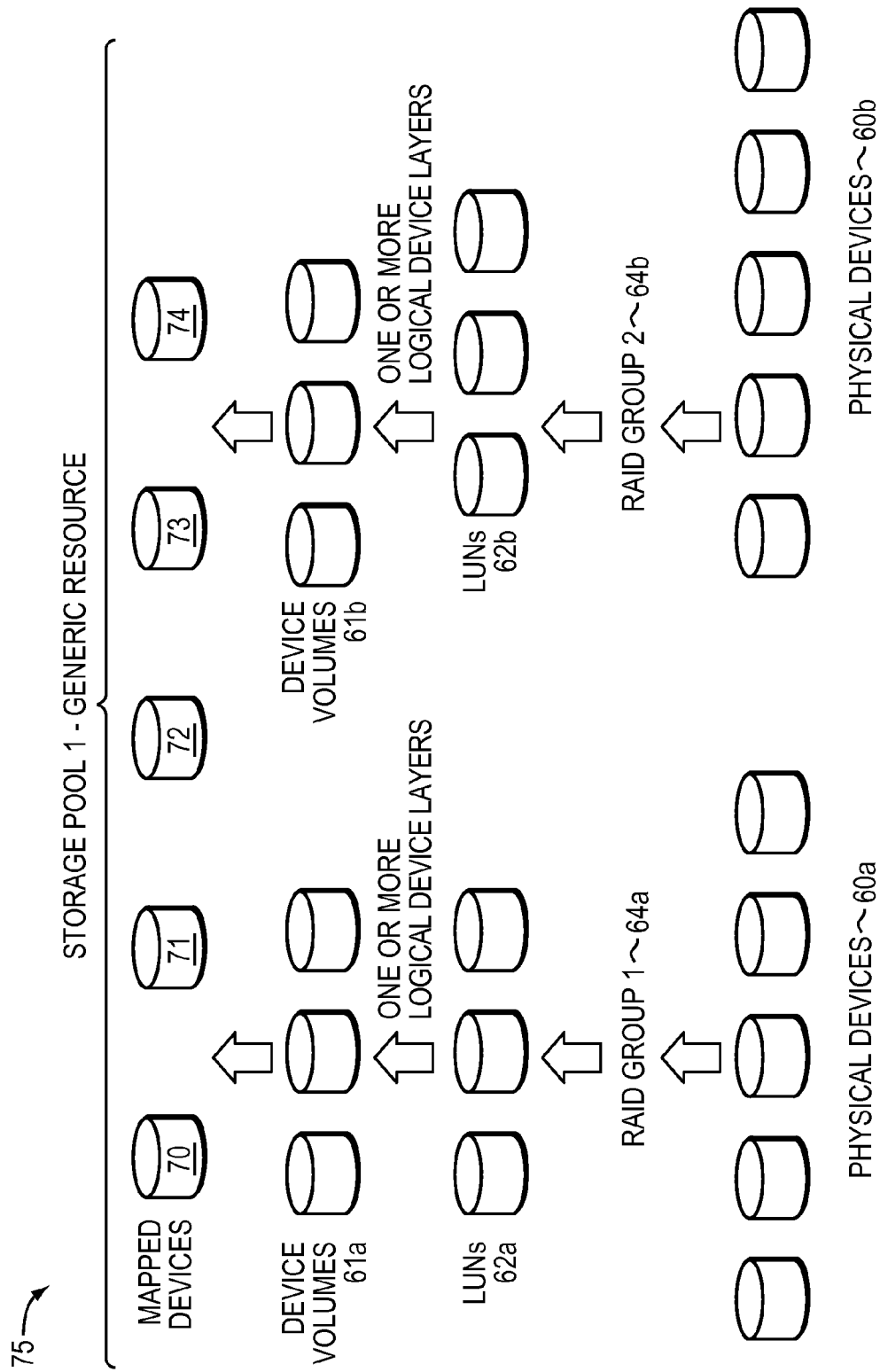
FIGS. 4 and 5 are examples illustrating storage device layout.

Referring to FIG. 4, shown is an example representing how data storage system best practices may be used to form storage pools. The example 75 illustrates how storage pools may be constructed from groups of physical devices. For example, RAID Group1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 75 illustrates two RAID groups being used to define a single storage pool although, more generally, one or more RAID groups may be used for form a storage pool in an embodiment using RAID techniques.

The data storage system 12 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the mapped device results in either a null pointer (or equivalent) indicating that no corresponding physical storage space has yet been allocated, or results in a reference to a data device which in turn references the underlying physical storage space.

A disk may be a physical disk within the storage system. A LUN may be a logical unit number which is an identifier for a Logical Unit. Each slice of data may have a mapping to the location of the physical drive where it starts and ends.

Figure 5:
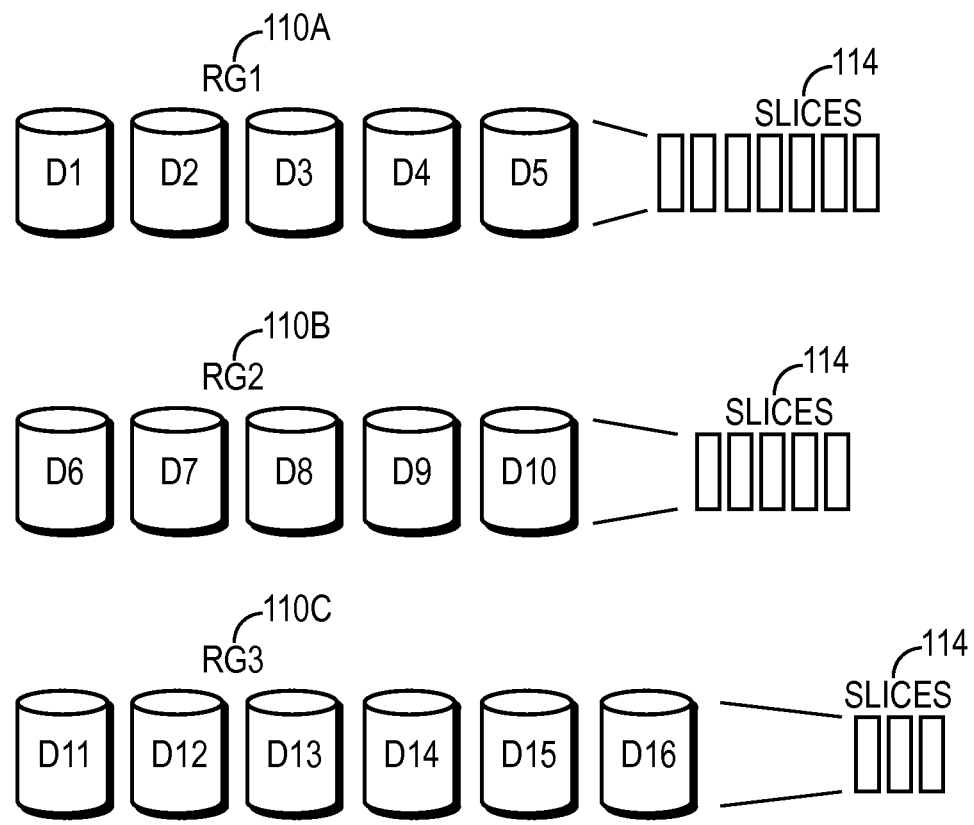

Referring to FIG. 5, shown is a diagram illustrating an exemplary logical division of storage of a data storage system into storage objects (such as RAID groups) for managing recovery of file system that may be included in an embodiment using the techniques described herein. With reference also to FIGS. 1-4, for example, a storage entities may refer to either a single storage device or a RAID group operating as a single storage device, may be further subdivided into logical units. A single RAID group or individual storage device may contain one or more logical units (LUs). However, RAID groups need not correspond to LUs and RAID groupings may be further divided into two or more LUs. In addition to RAID groups, each logical unit may be further subdivided into portions of a logical unit, referred to as "slices" 114. Slices 114 may be allocated, de-allocated, re-allocated, reserved, or redistributed by a slice manger. A slice may be, for example, a 1 GB slice of data. Further, a slice may be, for example, a 256 MB slice of data. However, the techniques described herein should not be construed as being limited to only slices of data; the techniques are equally applicable to other data chunk sizes, such as blocks, slivers (subset of slices), page, file or the like. The slice manager may be a software application or layer that is executed, at least in part, by one or more SPs 46A, 46B. The slice manager may be responsible for implementing a slice allocation policy and/or algorithm. For example, the slice manager may receive slice allocation requests, and maintain relevant statistical information regarding slices.

Figure 6:
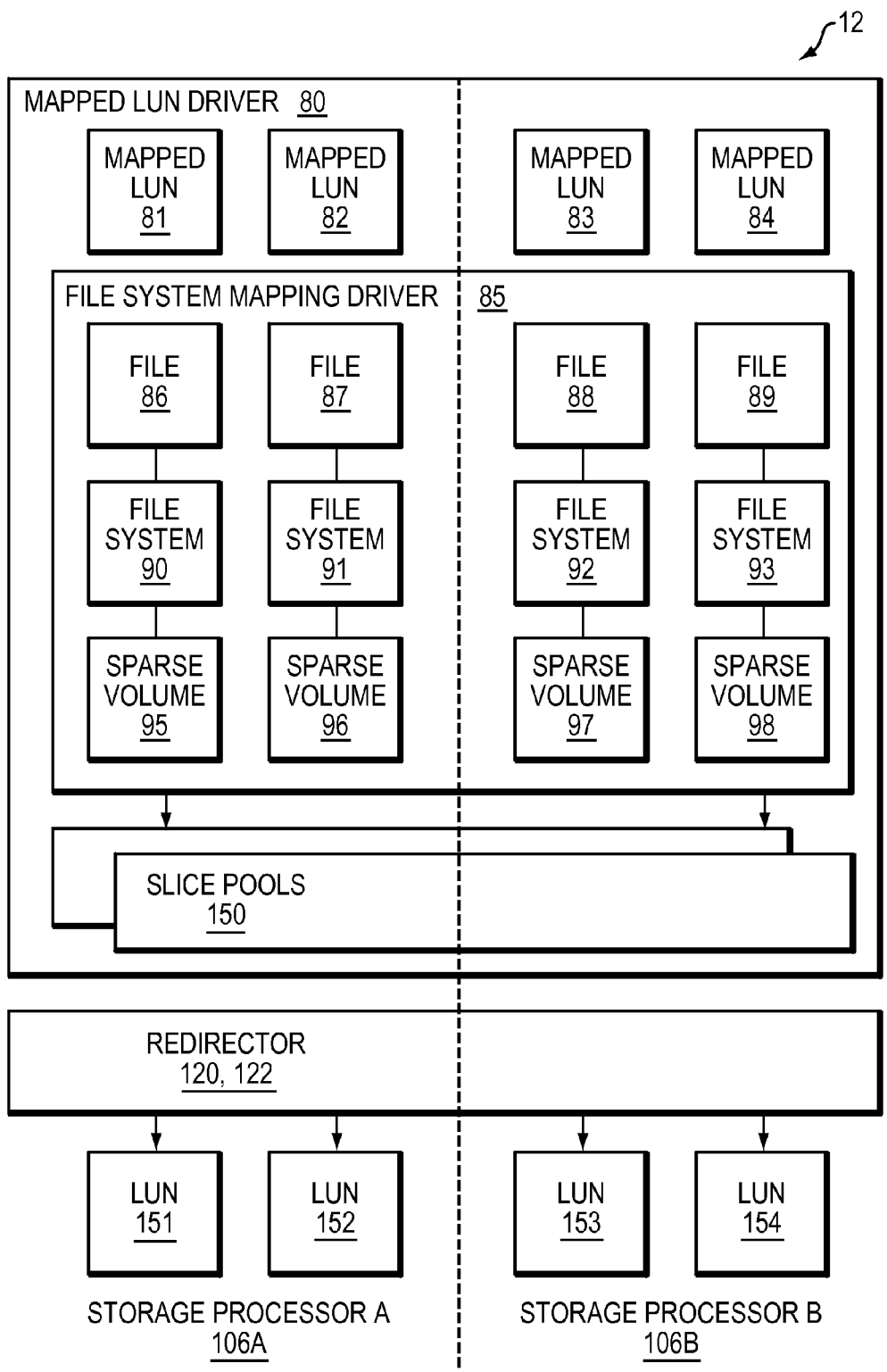
FIG. 6 is a block diagram illustrating in more detail components that may be used in connection with techniques herein.

Referring to FIG. 6, shown is more detailed example of an embodiment of a computer system that may be used in connection with performing the techniques described herein. With reference also to FIGS. 1-5, in a data storage system such as data storage system 12, a storage processor provides communications between host 14 and disk drives 60. Data storage system 12 includes at least two storage processors 106A, 106B. Both storage processor A (SPA) 106A and storage processor B (SPB) 106B provides access to LUNs 105-108 built from a storage space provided by disk drives 60. Redirector 120, 122 interacts with storage processors 106A, 106B to access LUNs 105-108. The access to LUNs 105-108 is independent of which storage processor each Flare LUN belongs to. A user of data storage system 12 allocates storage from LUNs in fixed sized chunks. Each fixed size chunk is known as a slice. One or more slices are grouped together to create a slice pool. Host system 14 provisions storage from slice pools 100 for creating mapped LUNs 81-84. A mapped LUN is a LUN that is visible to host system 14 and a user of a data storage system. A mapped LUN may be a thin LUN (TLU) or a direct LUN (DLU). The size of a thin LUN is independent of amount of available storage. Typically, storage is allocated to a thin LUN when host system 14 issues a write request and needs a data block to write user's data. The size of a direct LUN is dependent of amount of available storage. Typically, storage is allocated to a direct LUN at the time the direct LUN is created and initialized. File system mapping driver 85 is a lightweight file system library that provides file system functionality and allows data storage system 12 to create files within a file system. File system mapping driver 85 processes I/Os directed to metadata of a file system. Mapped LUN driver 80 processes I/Os directed to data of the file system. Mapped LUN driver 80 also provides slices of storage from slice pools 100 to file system mapping driver 85 for creating a file system. Slices of storage can be dynamically added or removed by a file system. When a slice is removed, the file system redistributes data stored on the slice to other slices in the file system. File system mapping driver 85 allocates file system blocks from slices of storage for creating files and storing metadata of a file system. In at least some embodiments of the current technique, size of the file system block may be 8 kilobyte (KB) in size. A sparse volume concatenates slices of storage provided to file system mapping driver 85 into a logical contiguous address space on which a file system is created. The sparse volume maintains logical to physical mapping for slices of storage in a slice database for the slices that are provisioned to address space of the sparse volume and are in use. Further, the file system maintains a bitmap for every slice of physical storage which is in use by the file system such that the bitmap includes information regarding the entire address space of the file system. A mapped LUN presents a file as a LUN to host system 11. Further, the file presents a contiguous logical address space to the mapped LUN. For example, in FIG. 5, mapped LUN 81 presents file 86 as a LUN to host system 11, file 86 is created in a file system 90 and file system 90 is created from sparse volume 95. Similarly, mapped LUNs 82-84 presents file 87-89 as LUNs respectively to host system 11, files 87-89 are created in file systems 91-93 respectively and file systems 91-93 are created from sparse volumes 96-98 respectively. Further, sparse volumes 95-98 are created from slices of physical storage included in slice pools 100.

Figure 7:
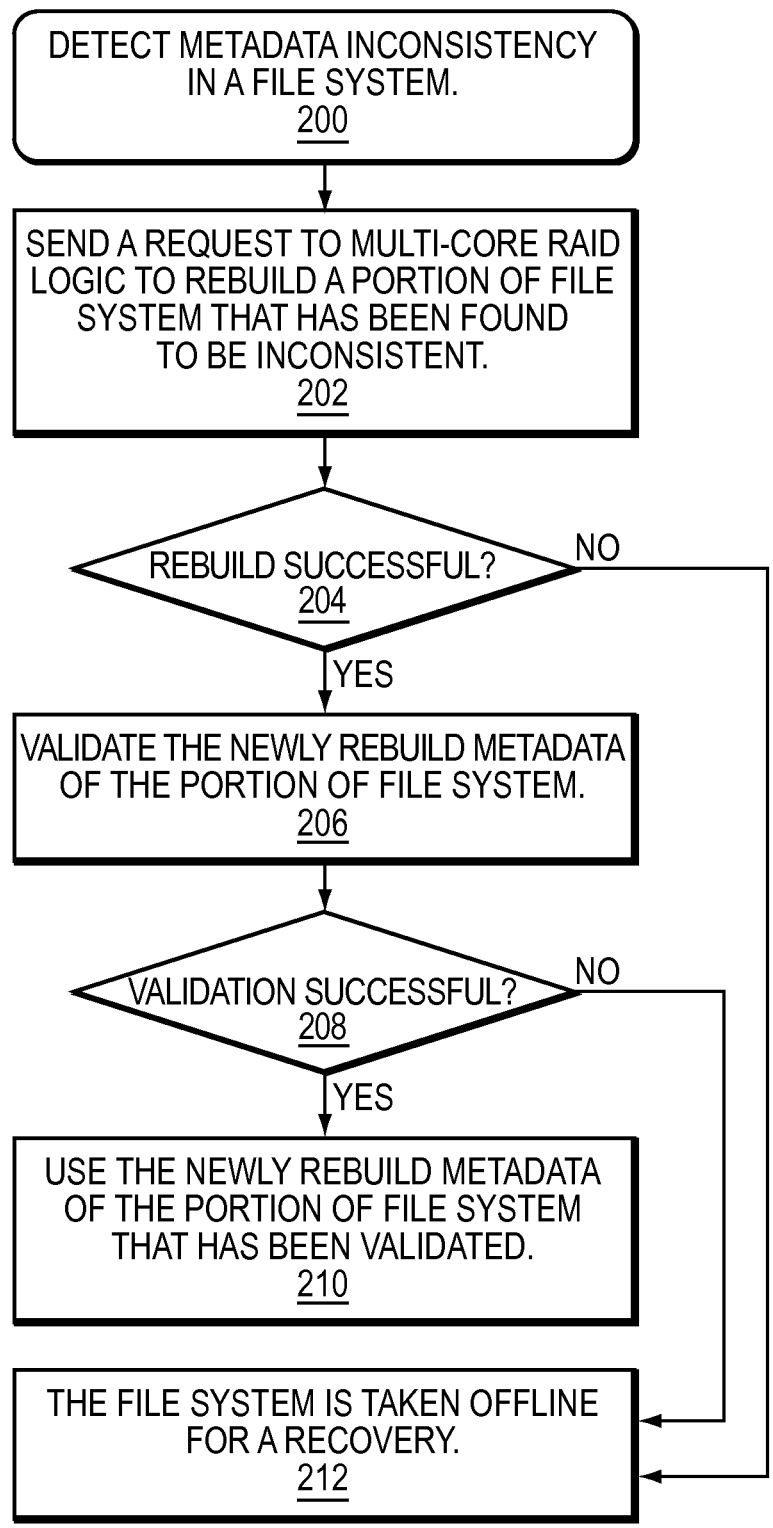
FIG. 7 is a flow diagram illustrating processes that may be used in connection with techniques herein.

Referring to FIG. 7, shown is a more detailed flow diagram illustrating managing recovery from metadata inconsistencies in storage systems. With reference also to FIGS. 1-6, a metadata inconsistency in one or more file system block is detected in a file system by data services 124 which may include file system mapping driver 85 (step 200). File system mapping driver 85 sends a request to RAID management component such as MCR 132, 138 for recovering from the metadata inconsistency by rebuilding a set of file system blocks that has been found to be inconsistent (step 202). A determination is made as to whether MCR 132, 138 has been successful in rebuilding the set of file system blocks (step 204). Upon determining that rebuilding of contents of the set of file system blocks has been successful, file system mapping driver 85 validates the newly rebuild metadata by comparing checksum associated with the set of file system blocks with the newly computed checksum for the newly rebuild metadata (step 206). A determination is made as to whether validation of the newly rebuild metadata has been successful (step 208). Upon determining that file system mapping driver 85 has successfully validated the newly rebuild set of file system blocks, the newly rebuild set of file system blocks are used by the file system mapping layer 85 (step 210). However, upon determining that validation of the newly rebuild set of file system blocks has failed, the file system is marked as offline for a recovery and access to the file system is lost (step 212).

Generally, a file system mapping driver 85 includes a capability for detecting metadata inconsistencies. Further, conventionally, file system mapping driver 85 recovers from metadata inconsistencies by duplicating metadata and using a duplicate copy of metadata upon detecting that a primary copy of the metadata has been corrupted. Further, a checksum value is managed for each file system block to detect whether a file system block contains valid metadata. Generally, when contents of a file system block are read, a new checksum is computed and compared with the checksum value associated with the file system block. Conventionally, upon detecting that the computed checksum for a file system block does not match with the checksum value stored for the file system block, a duplicate copy of metadata for the file system block is used to recover from such inconsistency. However, in such a conventional system, managing duplicate copies of metadata and reading duplicate copies of metadata from storage devices impacts performance of a storage system.

In contrast, in at least one embodiment of the current technique, file system mapping layer 85 uses a capability of a lower layer such as MCR 132, 138 to recover from file system block inconsistencies detected by the file system mapping layer 85. Thus, in at least one embodiment of the current technique, MCR 132, 138 leverages RAID group logic to rebuild metadata that may have become inconsistent. Thus, in at least one embodiment of the current technique, file system mapping driver 85 computes checksum for a file system data block, compares with the checksum value stored for that file system block and upon detecting that the comparison of checksum values has failed, file system mapping driver 85 sends a request to MCR 132, 138 to rebuild metadata for the file system block. In at least one embodiment of the current technique, file system mapping driver 85 provides information such as LUN id, offset, and length to MCR 132, 138 for determining a portion of a disk drive that needs to be rebuild. Further, file system mapping driver 85 uses a set of interfaces to send a request to MCR 132, 138 for rebuilding inconsistent metadata.

However, it should be noted that a checksum mechanism is one way for detecting metadata inconsistency and any other known method for detecting metadata inconsistencies may be employed by file system mapping layer 85. Further, it should be noted that using RAID group logic is one way for rebuilding inconsistent metadata and any other known method for rebuilding inconsistent metadata may be employed by a RAID management component. Further, it should be noted that a RAID group may employ any number of known parity schemes.

Thus, in at least one embodiment of the current technique, redundancy and resiliency provided by a lower layer component is leveraged by an upper layer component to recover from metadata inconsistencies. Thus, in such a case, an upper layer component provides a hint as to the location of inconsistent metadata within a storage device which helps a lower layer component to detect a failure in the storage device such that appropriate corrective actions may be taken to recover from failure of the storage device.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in recovering from metadata inconsistencies in storage systems, the method comprising:
   detecting, by a file system management component, a metadata inconsistency in a portion of a file system, wherein the file system is managed by the file system management component, wherein the file system management provides a portion of storage space of a storage device of a storage system to a user as the file system;
   receiving a request, by a storage management component, from the file system management component for recovering the portion of the file system, wherein the file system management component is in communication with the storage management component, wherein the storage management component manages access to the storage device and is enabled to rebuild contents of the storage device, wherein the file system management and storage management components are included in the storage system;
   recovering, by the storage management component, the portion of the file system, wherein the storage management component recovers the portion of the file system by rebuilding the portion of the file system, wherein the file system management component provides information regarding the portion of the file system to the storage management component, wherein the information identifies a portion of the storage device for rebuilding the portion of the file system; and
   validating, by the file system management component, the portion of the file system that has been recovered by the storage management component, wherein the file system management component validates the portion of the file system by verifying consistency of the portion of the file system based on metadata information for the portion of the file system maintained by the file system management component.

2. The method of claim 1, wherein the file system management component includes a file system mapping driver.

3. The method of claim 1, wherein the storage management component includes a multi-core RAID logic.

4. The method of claim 1, wherein the metadata inconsistency is detected by comparing checksum values for the portion of the file system.

5. The method of claim 1, wherein the portion of the file system is validated by comparing a newly computed checksum for the portion of the file system and a checksum value associated with the portion of the file system.

6. The method of claim 1, wherein the portion of the file system includes a file system block.

7. The method of claim 1, wherein a file system is associated with a set of sparse volumes, wherein each sparse volume includes a set of slices, each slice of the set of slices is a logical representation of a subset of physical disk storage.

8. The method of claim 1, wherein the file system resides on the storage system, wherein the storage system includes a disk drive system comprising a plurality of Redundant Array of Inexpensive Disks (RAID) systems, each RAID system of the plurality of RAID systems having a first disk drive and a second disk drive.

9. The method of claim 1, wherein the portion of the file system is recovered by rebuilding the portion of the file system by a multi-core RAID logic.

10. The method of claim 1, further comprising:
    updating the state of the system to an offline state for recovering the file system upon determining that the validation of the portion of the file system has failed.

11. A system for use in recovering from metadata inconsistencies in storage systems, the system comprising a processor configured to:
    detect, by a file system management component, a metadata inconsistency in a portion of a file system, wherein the file system is managed by the file system management component, wherein the file system management provides a portion of storage space of a storage device of a storage system to a user as the file system;
    receive a request, by a storage management component, from the file system management component for recovering the portion of the file system, wherein the file system management component is in communication with the storage management component, wherein the storage management component manages access to the storage device and is enabled to rebuild contents of the storage device, wherein the file system management and storage management components are included in the storage system;
    recover, by the storage management component, the portion of the file system, wherein the storage management component recovers the portion of the file system by rebuilding the portion of the file system, wherein the file system management component provides information regarding the portion of the file system to the storage management component, wherein the information identifies a portion of the storage device for rebuilding the portion of the file system; and
    validate, by the file system management component, the portion of the file system that has been recovered by the storage management component, wherein the file system management component validates the portion of the file system by verifying consistency of the portion of the file system based on metadata information for the portion of the file system maintained by the file system management component.

12. The system of claim 11, wherein the file system management component includes a file system mapping driver.

13. The system of claim 11, wherein the storage management component includes a multi-core RAID logic.

14. The system of claim 11, wherein the metadata inconsistency is detected by comparing checksum values for the portion of the file system.

15. The system of claim 11, wherein the portion of the file system is validated by comparing a newly computed checksum for the portion of the file system and a checksum value associated with the portion of the file system.

16. The system of claim 11, wherein the portion of the file system includes a file system block.

17. The system of claim 11, wherein a file system is associated with a set of sparse volumes, wherein each sparse volume includes a set of slices, each slice of the set of slices is a logical representation of a subset of physical disk storage.

18. The system of claim 11, wherein the file system resides on the storage system, wherein the storage system includes a disk drive system comprising a plurality of Redundant Array of Inexpensive Disks (RAID) systems, each RAID system of the plurality of RAID systems having a first disk drive and a second disk drive.

19. The system of claim 11, wherein the portion of the file system is recovered by rebuilding the portion of the file system by a multi-core RAID logic.

20. The system of claim 11, further comprising:
update the state of the system to an offline state for recovering the file system upon determining that the validation of the portion of the file system has failed.

* * * * *